Sept. 11, 1928.
W. J. STARLING
BALANCING MEANS FOR VEHICLE WHEELS
Filed Oct. 18, 1926
1,684,290
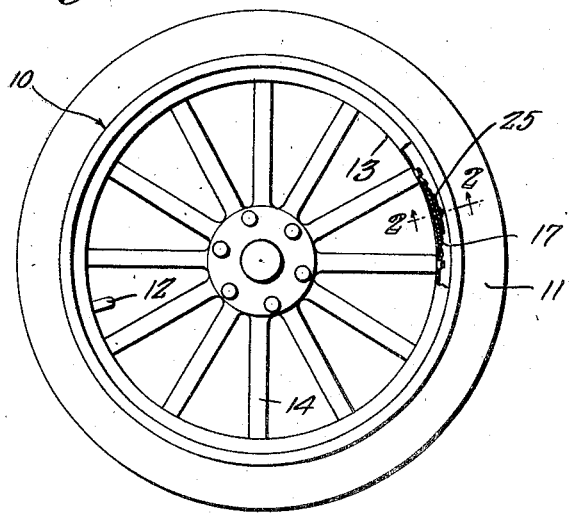
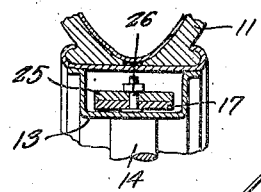
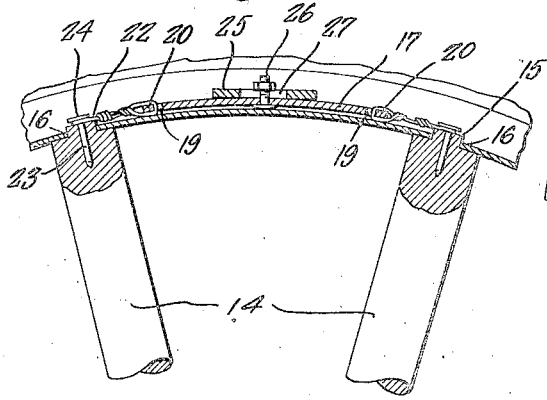
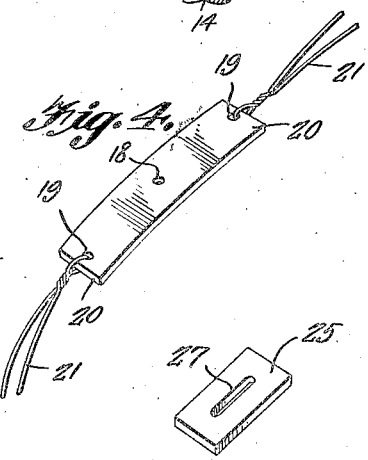
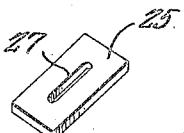

Patented Sept. 11, 1928.

1,684,290

UNITED STATES PATENT OFFICE.

WILLIAM J. STARLING, OF CHICAGO, ILLINOIS.

BALANCING MEANS FOR VEHICLE WHEELS.

Application filed October 18, 1926. Serial No. 142,334.

This invention relates to certain novel improvements in balancing means for vehicle wheels and has for its principal object the provision of an improved construction of this character which will be highly efficient in use and economical in manufacture.

Among the salient objects of the invention is the provision for balancing a vehicle wheel to permit smooth braking when the brakes are applied to stop the vehicle and to permit smooth traction when the vehicle is travelling at a high rate of speed.

A further object of the invention is to provide a separate and removable device which may be applied to a wheel of standard shape without changing the wheel in any way and which may be tr nsferred from one wheel to the other as is expedient.

A still further object of the invention is to utilize the felly of the wheel to hold and to conceal the balancing means.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a side elevational view of a vehicle wheel showing parts thereof removed to illustrate the application of the invention, Fig. 2 is a sectional detail view taken substantially on line 2—2 of Fig. 1, Fig. 3 is an enlarged longitudinal sectional detail view of the invention showing the same applied to a fragmentary portion of a vehicle wheel, Fig. 4 is a perspective view of one of the weight members embodied in the invention, and Fig. 5 is a perspective view of another weight member embodied in the invention.

In the drawings I have shown the balancing means as applied to a vehicle in position directly opposite the valve structure of the inner tube of the tire for balancing the wheel according to the weight of the valve structure. It is pointed out that while I have shown the balancing means in the position above described it may be disposed in any other position for functioning to accomplish the desired result and particularly for giving a true balance to the wheel.

In Fig. 1 of the drawing 10 indicates a vehicle wheel which includes a tire 11 within which is arranged the usual pneumatic tube (not shown) comprising the valve structure 12. This wheel 10 includes the usual felly 13 and spokes 14 which have reduced end portions 15 projecting through openings 16 formed in the felly 13.

I preferably connect my improved balancing means to the spokes 14 in order that I may offset the weight of the valve structure and thus properly balance the wheel.

The balancing means comprise a base weight plate 17 which has a central opening 18 formed therein and openings 19 formed in its end portions 20. A connecting wire 21 is drawn through each of the openings 19 and curled to form a loop 22. This loop 22 is adapted to embrace the shank 23 of a nail 24 which is driven into the reduced end portion of the adjacent spoke 14.

Connected to this base plate is a top weight plate 25. This top weight plate 25 is connected to the plate 17 through the medium of a nut receiving bolt 26.

At this time it is pointed out that any number of plates 25 may be used in order to provide a perfect balance for the wheel.

In the present instance I have shown the plate 25 as being capable of adjustment relative to the plate 17 and this is accomplished by providing an elongated slot 27 in the plate 25 through which a nut receiving bolt 26 projects. By adjusting the plate 26 relative to the plate 17 a true balance may be made.

While I have shown the plate 25 provided with the elongated slot 27 it is manifest that this slot may be eliminated and a hole substituted therefore for the passage of the nut receiving bolt 26.

I have found by use of a balancing device as herein described smooth braking is greatly facilitated and the vibrations of the vehicle when travelling at a high rate of speed are greatly diminished.

While I have illustrated and described the preferred form of construction for carrying my invention into effect, this is capable of variation and modification, without departing from the spirit of the invention. I. therefore, do not wish to be limited to the precise details of construction set forth, but desire to avail myself of such variations and modifications as come within the scope of the appended claims.

The invention having been set forth, what

I claim as new and desire to secure by Letters Patent, is:

1. The combination with a vehicle wheel having a felly and spokes having corresponding end portions connected to the felly, of a balancing device carried by said felly, and means connecting said balancing device to said spokes.

2. A balancing device including a base weight member, a top weight member, and means connecting the top member to the base member permitting relative adjustment between said top member and said base member.

3. A balancing device of the class described including a base weight member, a top weight member having an elongated slot formed therein, means for connecting the base weight member to adjacent spokes of a vehicle wheel, and a member projecting through said slot for connecting the top member and the base member together while permitting relative adjustment between said top member and said base member.

4. The combination with a vehicle wheel including a felly and spokes having corresponding end portions connected to the felly, a base weight member carried by the felly, means for connecting said base member to corresponding end portions of the spokes, said means including wire members having outer end portions provided with loops and attaching nails inserted through said loops and adapted to be driven into said end portions of the spokes, a top weight member having an elongated slot formed therein, and a nut bearing bolt adapted to project through said slot for connecting the base member to the top member in a predetermined adjusted position between the base member and the top member.

In testimony whereof I affix my signature.

WILLIAM J. STARLING.